Nov. 8, 1955     H. M. STUELAND     2,723,039
IMPLEMENT MOUNTING MEANS FOR TRACTORS
Filed April 2, 1952                         2 Sheets-Sheet 1
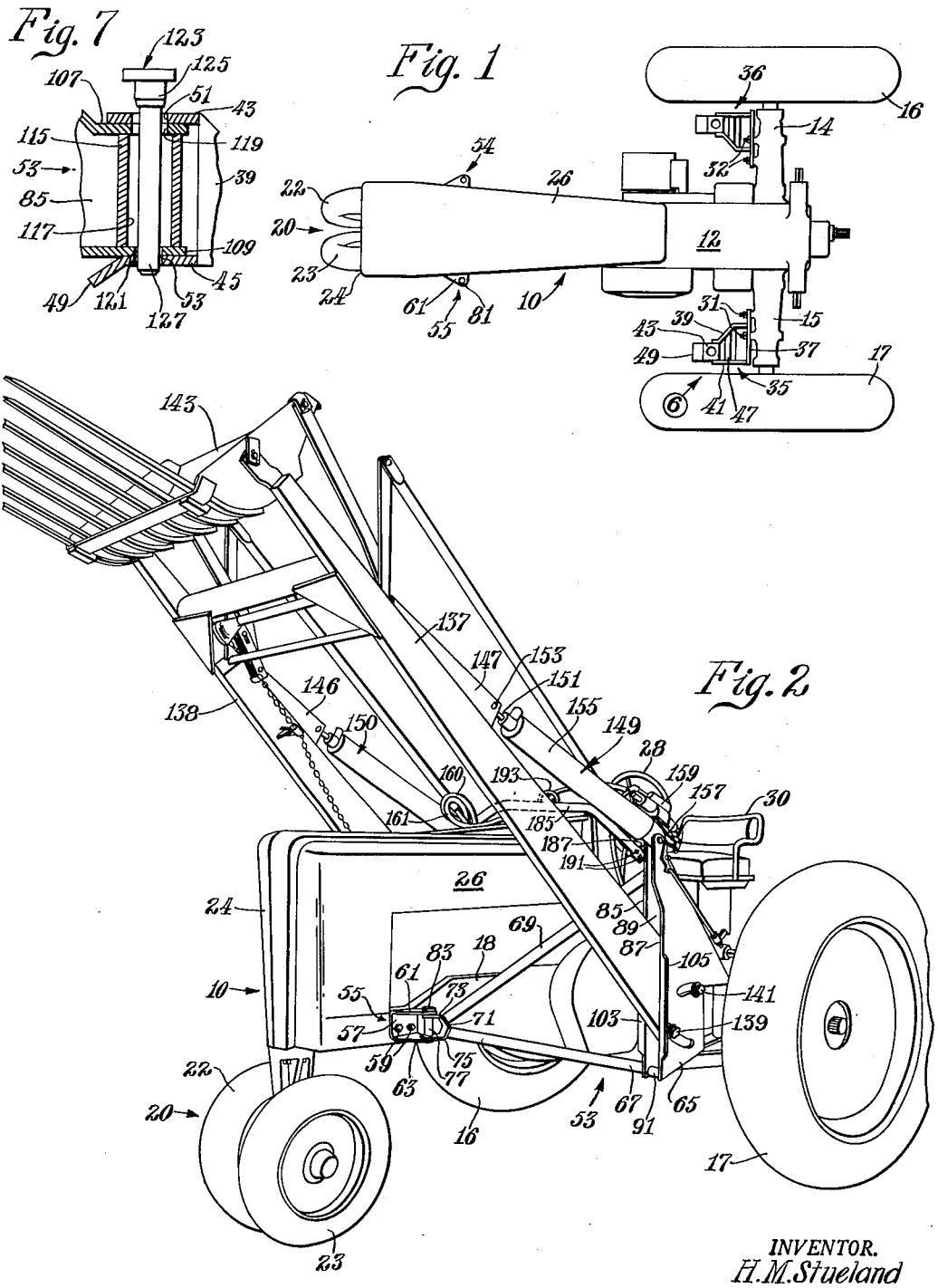
INVENTOR.
H. M. Stueland

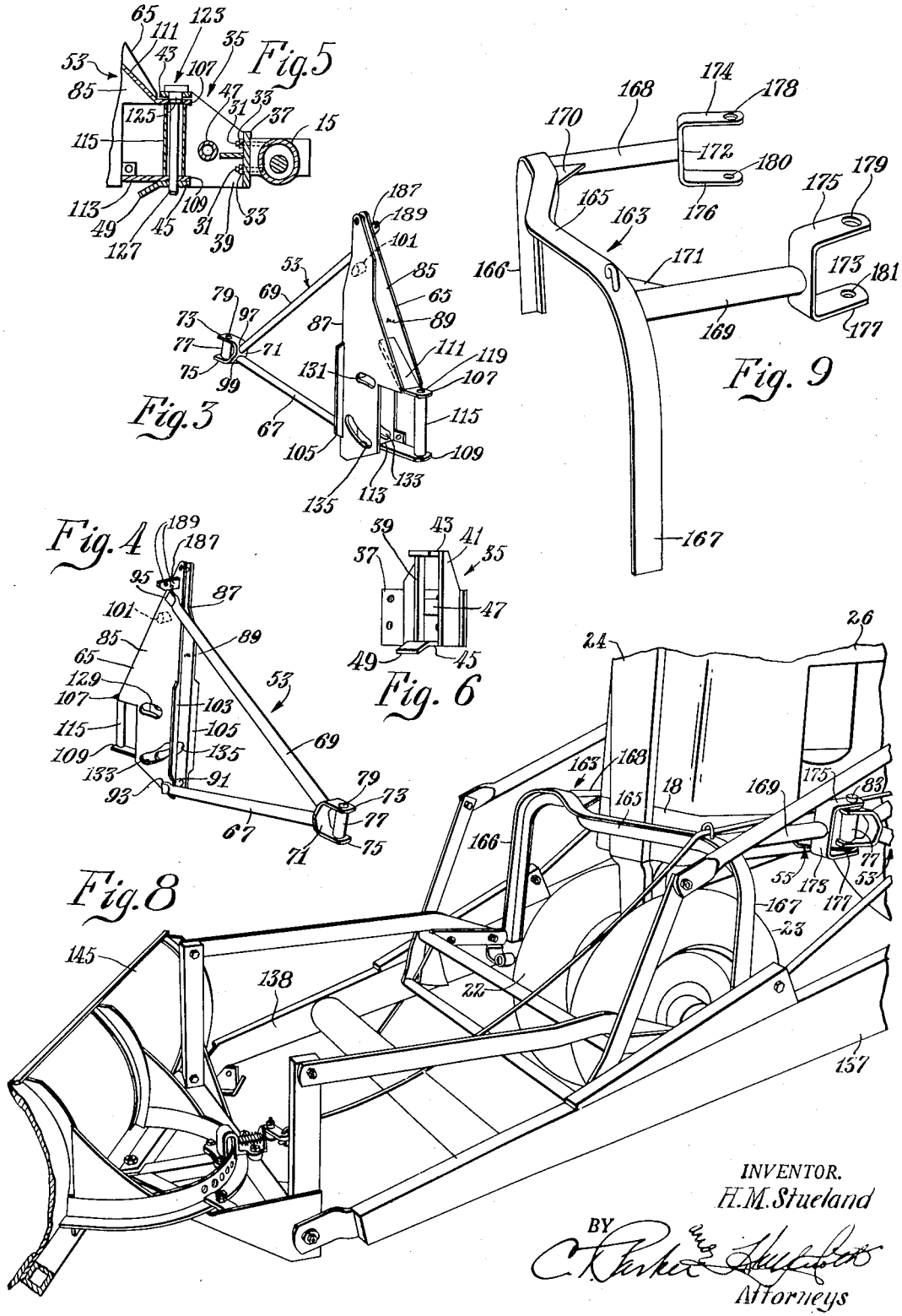
Nov. 8, 1955  H. M. STUELAND  2,723,039
IMPLEMENT MOUNTING MEANS FOR TRACTORS
Filed April 2, 1952  2 Sheets-Sheet 2
INVENTOR.
H. M. Stueland
Attorneys United States Patent Office 2,723,039
Patented Nov. 8, 1955

2,723,039

IMPLEMENT MOUNTING MEANS FOR TRACTORS

Harold M. Stueland, East Moline, Ill., assignor to Deere & Company, Moline, Ill., a corporation of Illinois Application April 2, 1952, Serial No. 280,105

5 Claims. (Cl. 214—140)

This invention relates to means for mounting implements on vehicles such as tractors and more particularly to support means for effecting the mounting of a load-moving machine on an agricultural tractor.

A typical tractor-mounted, load-moving machine in which the invention is particularly useful will normally comprise a tractor of conventional design having a relatively narrow longitudinal body carried at its front end on front wheels and at its rear end on rear wheel means including oppositely outwardly extending transverse axle housings at the ends of which are respectively carried the rear traction wheels. The load-moving machine, or "loader" as it may be more conveniently referred to, will include a pair of generally parallel, forwardly extending lift arms or booms having their rear ends connected respectively to pivots at opposite sides of a rear part of the tractor, the booms extending ahead of the tractor to carry a load-carrying element in the form of a bucket or scoop. It is important that both the tractor and any particular loader be versatile to the extent that one form of loader may be used with different types of tractors and a particular type of tractor may be used with different types of loaders. Although agricultural tractors are generally similar on the basis of the typical design referred to, there are quite a few dimensional diffences that create problems in the mounting of implements, particularly implements of other manufacturers. Likewise, a loader specifically adapted to fit a certain type tractor is difficult if not impossible to attach to another form of tractor.

According to the present invention, it is proposed to provide intermediary supporting structure that will render loaders or similar implements interchangeable with a large variety of tractors. For this purpose, there are provided a pair of basic supports adapted primarily to fit what may be termed a standard loader and to utilize secondary attaching means for adapting the basic supports to different types of tractors. It is another object of the invention to make it easy for the user to attach and detach the basic supports so that he may free his tractor for use with other implements. The invention has for another object the provision of a simple and economical design of basic support that may be used with many forms of tractors without materially, if at all, modifying the basic tractor construction. Other objects of the invention reside in the various combinations and sub-combinations of elements making up a preferred embodiment of the invention as described in detail in the following specification and accompanying sheets of drawings in which Figure 1 is a plan view of a typical agricultural tractor illustrating the mounting and location of the four simple attaching brackets;

Figure 2 is a perspective view of a typical loader mounted on the tractor of Figure 1, the loader being shown in its elevated position;

Figure 3 is a perspective view showing the left-hand side of a left-hand support for adapting the loader of Figure 2 to the tractor of Figures 1 and 2;

Figure 4 is a perspective view from the other side of the support;

Figure 5 is a fragmentary sectional view, on a slightly enlarged scale, showing the manner in which the rear end of the support of Figure 3 is mounted on one of the rear brackets shown in Figure 1;

Figure 6 is a perspective view of one of the rear brackets, as seen generally in the direction of the arrow bearing the encircled numeral 6 in Figure 1;

Figure 7 is a fragmentary sectional view on an enlarged scale showing a connecting pin having stepped-diameter portions and the use thereof in interconnecting related components in the mouting means;

Figure 8 is a perspective view of the front portion of a tractor showing a load-moving machine equipped with a bulldozer blade and embodying also a guide for stabilizing the lift arms or booms of the loader; and Figure 9 is an enlarged perspective view of the guide means by itself.

The tractor shown in Figures 1, 2 and 8 is of the so-called tricycle type comprising a longitudinal, relatively narrow body 10 including a rear transmission and final drive case 12 from opposite sides of which project laterally elongated, right- and left-hand axle housing 14 and 15. These axle housings comprise part of the means for carrying the rear end of the tractor, which means also includes right- and left-hand traction wheels 16 and 17.

The body 10 includes a forward frame part 18 rigidly joined to a forward portion of the transmission and final drive case 12 and supported at its front end on a front rolling truck or wheel means 20, here comprising closely spaced, right- and left-hand front wheels 22 and 23. Any other form of front truck may be utilized, such as the conventional single wheel in place of the dual wheels 22 and 23. These details are immaterial. Also, the tractor could as well be equipped with a wide-tread axle structure, as is also conventional.

The forward part of the body includes the usual radiator grille 24 and rearwardly extending engine hood 26, the latter of which terminates at its rear end ahead of a steering wheel 28 and operator's seat 30. The latter details have been omitted from Figure 1 in the interests of more clearly showing the design of the axle housings 14 and 15.

Figure 5 shows that the left-hand axle housing 15 has a plurality of both vertically and horizontally spaced apart mounting studs 31, each of which may receive a securing nut 33 for effecting the attachment to the axle housing 15 of various types of implements or implement-mounting brackets. The left-hand rear mounting bracket is designated generally by the numeral 35 and is shown by itself in perspective in Figure 6. A similar bracket 36 is mounted on the front face of the right-hand axle housing 14 by means of mounting studs 32 similar to the mounting studs 31 in the left-hand axle housing 15. Although the mounting brackets 35 and 36 are not identical, they are symmetrical and it is deemed that a description of only the left-hand bracket 35 will suffice.

The bracket 35 includes a transverse upright rear plate 37 positionable to engage the front face of the left-hand axle housing 15 and apertured to receive the forwardly extending studs 31. The base plate is secured in place by the nuts 33 previously described. The bracket 35 further includes inner and outer forwardly extending side plates 39 and 41, preferably welded to the base plate 37. This base plate provides means for effecting the removable affixation of the bracket 35 to the axle housing 15. The bracket further includes means providing forwardly extending upper and lower ears 43 and 45, each of which is positioned between and preferably welded to marginal portions of the plates 39 and 41 to serve as means for spacing the plates apart. An additional spacer 47, preferably of tubular construction and preferably welded in place, is provided between the side plates. The lower ear 45 includes an integral forward extension 49 turned down to provide a ramp, for purposes to presently appear.

The ears or ear means 43 and 45 are apertured in vertical alinement, being provided with coaxial openings 51 and 53 respectively. The diameter of the upper circular opening 51 is slightly greater than that of the lower circular opening 53, the reason for which will appear below.

The brackets 35 and 36 may be manufactured in varying sizes and forms, primarily by varying the aperturing of the base plate 37 so as to adapt the brackets to the axle housings of different types of tractors. By this means, the basic loader support, to be presently described, may be made to fit several makes and sizes of tractors.

The mounting means includes a pair of basic supports, only the left-hand one of which appears in the drawings. This left-hand support is designated in its entirety by the numeral 53 and is shown by itself from opposite sides in Figures 3 and 4. The presence of a symmetrical right-hand support may be readily assumed and its location and mounting will readily follow from the ensuing description of the left-hand support alone.

In addition to the right- and left-hand rear mounting brackets 36 and 35, the implement-mounting means includes right- and left-hand front brackets 54 and 55. Since these brackets are symmetrical, a description of the left-hand bracket 55 will suffice for both. This bracket comprises an upright longitudinal flange 57 appropriately apertured to be secured by a pair of cap screws 59 to a forward portion of the left side of the tractor. Any other suitable securing means may be used. The bracket further includes upper and lower horizontal flanges 61 and 63 which provide rearwardly and outwardly extending apertured ears that define between them a rearwardly and laterally outwardly opening pocket. This pocket faces toward the forwardly and laterally opening pocket defined by the ear means 43 and 45 on the left-hand rear bracket 35. The pockets thus defined provide means for receiving front and rear ends of the basic support 53. The pockets defined by the front and rear brackets 54 and 36 at the right-hand side of the tractor similarly accommodate a right-hand basic support.

The support 53 is of triangular structure as viewed from the side and includes a rear upright element 65, a lower horizontal member 67 and a hypotenuse or brace member 69 diverging upwardly and rearwardly from the forward end of the lower member 67 to a rear upper part of the rear upright element 65. Specifically, the construction of the forward end of the support 53 comprises a U-shaped member 71 having a pair of forwardly extending ears 73 and 75 adapted to fit between and be received by the front bracket ears 61 and 63. Stated otherwise, the forward end of the support 53 is received in the front bracket pocket. The front end U-shaped member 71 has its ears 73 and 75 rigidly spaced apart by and joined to a vertical tubular member 77. The upper ear 73 has a circular opening 79 coaxial with the bore or hollow interior of the tubular brace 77. The lower ear 75 likewise has a circular opening (not shown) coaxial with the opening 79 and bore of the tubular member 77. When the front end of the support 53 is received in the pocket defined by the front end bracket ears 61 and 63, the bore and coaxial openings just described register with coaxial apertures or openings in the front bracket ears 61 and 63. The circular opening in the upper ear 61 appears in Figure 1 and is identified by the numeral 81. The opening in the lower ear 63 is not visible but its presence may be readily assumed. A connecting pin 83 is downwardly insertable through and upwardly withdrawable from the registering set of apertures and the bore in the tubular member 77. As stated above, the structure at the right-hand side of the tractor has symmetrical components and these need not be described in detail.

The rear upright element 65 of the support 53 comprises a pair of plate members 85 and 87 arranged in closely spaced apart side-by-side relationship to define therebetween a relatively narrow, vertically elongated, implement-receiving space 89. The lower parts of the plates 85 and 87 are rigidly held in spaced apart relationship by a short transverse spacer 91 which is preferably welded in place. The rear end of the lower horizontal support member 67 is rigidly secured, as by welding at 93, to the inner face of the lower part of the inner member 85. The lower horizontal member 67 is thus offset laterally relative to the general plane of the implement-receiving space 89. The hypotenuse or brace member 69 is similarly offset laterally in the same direction as the lower member 67 and the rear upper end of the hypotenuse member is rigidly secured, as by welding at 95, to the inner face of an upper part of the inner plate 85. The forward ends of the members 67 and 69 are preferably welded respectively at 97 and 99 to the U-shaped front end member 71.

The spacer means 91 is in the zone of the junction of the rear end of the lower horizontal member 67 and the lower part of the element 65. This arrangement suitably braces the plates 85 and 87 against transverse collapse. Upper spacer means in the form of a short tubular member 101 is welded in place to space the upper end portions of the plates 85 and 87 transversely apart. This spacer is close to the zone of the junction of the upper end of the hypotenuse or brace member 69 with the upper part of the inner plate 85. The plates 85 and 87 are respectively flanged outwardly along their forward marginal edge portions at 103 and 105, by means of which the strength of the plates is increased.

In addition to having the lower and upper spacers 91 and 101, the plates 85 and 87 are spaced apart by upper and lower mounting ear means 107 and 109. These ear means are horizontally arranged and extend rearwardly from between the plates 85 and 87 and are spaced vertically apart at such distance as to fit between the vertically spaced apart ear means 43 and 45 on the left-hand attaching bracket 35 (Figure 5). The ears 107 and 109 respectively extend part way into the implement-receiving space 89, as at 111 and 113 and are preferably welded to the inner faces of the plate members. The construction of the support 53 is such that it is rendered substantially rigid and unitary and is in effect a one-piece fabricated element.

The ears are rigidly braced in vertically spaced apart relation by an upright tubular member 115, the hollow interior of which provides a vertical bore 117. The upper ear 107 is apertured so that it has a circular opening 119 coaxial with the bore 117. The lower ear 109 has a smaller circular opening 121 also coaxial with the bore 117. The opening 119 and the opening 51 in the upper ear 43 of the bracket 35 are of the same diameter, which diameter is larger than the equal diameters of the lower opening 121 and the lower opening 53 in the ear 45 of the bracket 35. When the support is assembled with its rear end received in the pocket defined by the ears 43 and 45 of the bracket 35, the two upper openings 51 and 119 are in register and the two lower openings 53 and 121 are in register, and all openings are, of course, coaxial with the bore 117. A connecting pin 123 is downwardly insertable into and upwardly withdrawable from the alined openings and bore to form means for interconnecting the rear end of the support 53 and the bracket 35. As best shown in Figure 7, the pin 123 has upper and lower stepped-diameter portions 125 and 127 which are respectively receivable in the registering upper openings 51 and 119 and registering lower openings 53 and 121. The axial length of the smaller diameter portion 127 of the pin 123 is such that the lower end of the pin may be completely received by the two registering openings 53 and 121 before the enlarged diameter upper portion 125 is received by the registering upper openings 51 and 119. This facilitates insertion of the pin, since the upper and lower portions of the assembly may be separately alined and as long as the pin portion 127 is receivable by both openings 53 and 121, the support is temporarily held in place and it is a simple matter to aline the upper openings 51 and 119 to receive the larger diameter upper portion 125 of the pin. It will be observed that the diameter of the bore 117 within the tubular member 115 is larger than the smaller diameter pin portion 127 so that the tubular member 115 does not serve as a bearing member. However, the tubular member does serve as a brace in both compression and torsion.

The pin 83 that forms the interconnection between the front end of the support 53 and the front left-hand bracket 55 is identical to the pin 123 just described and the arrangement of the cooperative openings in the front bracket 55 and the front member 71 at the front end of the support 53 is likewise the same as that just described. Accordingly, the effectiveness of the securing means is available at both ends of the support 53. Further, two additional pins similar to the pins 83 and 123, which additional pins are not shown, are used at the right-hand side of the tractor for mounting a right-hand support between the front and rear mounting brackets 54 and 36.

Since the connections at 83 and 123 are pivotal when established individually, one end of the support may be mounted in one of the brackets 35 or 55 and the other end may be swung into place. In this respect, the outwardly opening aspects of the respective pockets are of importance, since they eliminate the necessity for the operator to try to simultaneously aline both ends of the support 53.

The plates or upright side members 85 and 87 respectively have transversely alined upper arcuate slots 129 and 131 (Figures 3 and 4) and transversely alined lower arcuate slots 133 and 135. These slots provide an implement-supporting mount for pivotally carrying the rear end of a left-hand lift arm or boom 137 of a load-moving machine such as a loader as shown in Figure 2 or a bulldozer as shown in Figure 8. Such machine has a symmetrical right-hand arm or boom 138, the rear end of which is pivotally mounted on the right-hand support in a manner similar to that described in connection with the left-hand support 53. The particular pivotal mounting shown is of the type including a double pivot having upper and lower pivot members 139 and 141. A single pivot could be used if it is desired to follow conventional construction and, to the extent material here, the particular type of pivot is of no importance. That illustrated is of the kind forming the subject matter of copending application Serial No. 218,105, filed March 29, 1951, now Patent No. 2,679,943.

Regardless of the pivotal connection utilized between the rear ends of the booms 137 and 138, the booms are mounted at their rear ends in such manner that the forward ends may swing upwardly in longitudinal upright planes, the booms being long enough to extend ahead of the front end of the tractor. In the case of a tricycle-type tractor as illustrated, the booms will lie respectively at the outer sides of the wheels 22 and 23 of the front truck 20. If used on a wide-tread axle tractor, the booms 137 and 138 would preferably be curved downwardly and forwardly as shown in the patent referred to above. This is a matter of design and is not material here so far as the general organization is concerned but mention is made thereof to emphasize the versatility of the implement-mounting structure.

The forward ends of the booms 137 and 138 carry pivotally therebetween a load-carrying element 143, shown in Figure 2 as a bucket having forwardly extending tines conventionally useful in the handling of manure, for example. In Figure 8, the load-handling element is a bulldozer blade 145 interchangeable on the booms 137 and 138 with the bucket 143.

The booms 137 and 138 respectively have mounting brackets 146 and 147 thereon intermediate their front and rear ends. The bracket 147 serves as a pivotal mount for the forward end of a cylinder and piston assembly 149 and a similar cylinder and piston assembly 150 has its forward end carried by the bracket 146 on the right-hand boom 138. These assemblies may be of any conventional hydraulically powered type and may be suitably arranged in any manner to exert lifting forces on the boom 138. In the present instance, the assembly 149 is shown as having its piston rod 151 connected by a transverse pivot pin 153 to the bracket 147 and the rear end of its cylinder 155 connected by a removable transverse pivot pin 157 to the means provided by the transversely spaced apart upper ends of the plates 85 and 87 of the left-hand support 53. The right-hand assembly may be similarly mounted. With the arrangement shown, contraction of the assemblies 149 and 150 causes upward movement of the booms 137 and 138. The assemblies may of course be reversed from end to end, but the installation illustrated is preferred, since bending stresses in the piston rods are eliminated by lifting on the contracting or retracting strokes of the pistons. Again, these details are unimportant, except that the upper end of the support element 65 provides for the mounting of the rear end portion of the assembly.

The cylinder and piston assemblies 149 and 150 may be supplied with fluid under pressure from any convenient source (not shown) on the tractor by means including a valve in a valve housing 159 on the left-hand cylinder 155 and appropriate conduits 160 and 161 (Figure 2).

As the booms 137 and 138 move upwardly and downwardly, their rear end portions travel in the upright relatively narrow, implement-receiving spaces, as at 89. The spacers 91, 101, 111 and 113 are so arranged as not to interfere with pivotal movement of the rear portion of the left-hand boom 137. A similar arrangement is afforded, of course, at the other side of the tractor.

When the loader is converted so as to utilize the bulldozer blade 145 (Figure 8), it is desirable to guide or stabilize the boom arms 137 and 138 relative to the front wheels 22 and 23 of the tractor. For this purpose, there is provided as an additional attachment guide means designated generally by the numeral 163 (shown by itself in Figure 9) and comprising an inverted U-shaped member having a transverse horizontal bight 165 and right- and left-hand legs 166 and 167 depending respectively between the right-hand boom 138 and right-hand front wheel 22 and left-hand boom 137 and left-hand wheel 23. The guide means could, of course, be utilized in conjunction with the loader attachment shown in Figure 2. In general, its purpose is to prevent the boom arms 137 and 138 from engaging the front wheels 22 and 23. The problem will arise more often in connection with the use of the attachment as a bulldozer, because of the normal angularity of the blade 145 relative to the line of travel.

The means for attaching the guide means 163 to the forward portion of the tractor comprises right- and left-hand horizontally rearwardly extending legs 168 and 169. Each of these is rigidly secured as by welding to the proximate side of the U-shaped member and the components are appropriately braced by triangular gussets 170 and 171. The rear end of the right-hand horizontal leg 168 is rigidly secured as by welding to an upright bight portion 172 of a U-shaped attaching member having rearwardly extending upper and lower ears 174 and 176. These ears are apertured in vertical alinement to provide an upper circular opening 178 and a smaller lower circular opening 180. The relative diameters of the upper and lower openings 178 and 180 are adapted to cooperate with the stepped-diameter portions of the front connecting pin, which pin, as stated above, is identical to the pin 123 (Figures 5 and 7).

The right-hand horizontal leg 169 of the guide means 163 is similarly welded to a U-shaped member comprising an upright bight portion 173 having rearwardly extending upper and lower ears 175 and 177, which ears are respectively provided with circular openings 179 and 181. The U-shaped attaching member 173—175—177 embraces and cooperates with the left-hand front mounting bracket 55 in the same manner that the right-hand mounting means cooperates with the right-hand bracket 54 and the pin 83 or a substitute longer pin may be used if desired. The guide means is arranged so that it embraces the forward portion of the tractor with the legs 166 and 167 depending as aforesaid and with the horizontal legs 168 and 169 embracing the forward portion of the tractor.

The loader may be manufactured and sold as an assembly including the basic support 53, together with mounting brackets such as those shown at 54 and 55 and 35 and 36 or variations of the latter according to the type of tractor with which it is intended to use the loader. The basic supports may of course be sold separately as replacements or as means for adapting particular tractors to load-moving machines of either of the types shown in Figures 2 and 8 or of any other suitable type. In short, the design disclosed here is, as stated above, one of considerable flexibility and versatility and its over-all purpose is to increase the interchangeability among tractors and implements, whereby the purchaser of a single tractor is enabled to use this tractor with a large variety of implements.

Another feature of the invention is the combined tie brace and dismounting yoke 185, which cross-connects the upper end of the left-hand support 53 and the upper end of the similar support at the right-hand side of the loader. As shown in Figures 3 and 4, the inner member 85 of the upright element 65 has welded thereto an inwardly extending ear 187, which has a pair of apertures 189 therein for receiving bolts 191. These bolts pass through the proximate end of the yoke or brace 185. Not only is the loader structure thus tied together, but means is provided for the attachment of a lifting chain (not shown) for elevating the loader from the tractor for dismounting the loader. For this purpose the brace or yoke has an eye member 193. Of course, the eye member may be used in lowering the loader structure when mounting the loader on the tractor.

Various other important features and characteristics of the invention not specifically enumerated here will undoubtedly occur to those versed in the art, as likewise will numerous modifications and alterations in the preferred embodiments of the invention, all of which may be achieved without departing from the spirit and scope of the invention.

What is claimed is:

1. Implement mounting means for a tractor of the type having a longitudinal body carried at its rear end on means including oppositely laterally outwardly extending axle housings, comprising: a pair of rear brackets respectively having means thereon for the removable affixation thereof to the front faces of the axle housings to extend forwardly respectively at opposite sides of the tractor body, each bracket having upper and lower forwardly extending horizontal ears apertured in vertical alinement and defining a forwardly and laterally outwardly opening pocket; a pair of front brackets respectively having means thereon for the removable affixation thereof to opposite sides of the forward part of the tractor body, each front bracket having upper and lower rearwardly extending ears apertured in vertical alinement and defining between them a rearwardly and laterally opening pocket; a pair of supports positionable longitudinally respectively at opposite sides of the tractor body to extend between the associated front and rear brackets, each support having a rear end portion adapted to fit inwardly and rearwardly into and be received by the pocket defined by the associated rear bracket and having a vertical bore registrable with the associated upper and lower apertured ears, each support having a front end portion adapted to fit inwardly and forwardly into and be received by the pocket defined by the associated front bracket and having a vertical bore registrable with the associated upper and lower apertured ears, each support having means thereon for connection to an associated implement; and four individual mounting pins respectively downwardly insertable in and upwardly withdrawable from the sets of registering bores and apertured ears.

2. The invention defined in claim 1, in which: each of the front and rear end portions of each support is in the form of bifurcated means having upper and lower horizontal parts spaced vertically apart so as to fit between the upper and lower ears of the associated bracket; the furcations are rigidly interconnected by a vertical spacer extending between them; and said spacer is vertically tubular and said upper and lower parts have openings coaxial with said tubular spacer to effect said vertical bore.

3. The invention defined in claim 2, in which: the opening in said upper part is of larger diameter than the opening in the alined lower part; each mounting pin has a large-diameter upper end to fit the larger opening and a small-diameter lower end to fit the lower opening; and the diameter of the interior of the tubular spacer is greater than the small-diameter lower end of the pin.

4. An implement support of the character described, comprising: an upright rear element including a pair of parallel upright members closely spaced apart transversely to define a relatively narrow, upright implement-receiving space therebetween; rear means for supporting the element on a tractor or the like, including a pair of rearwardly projecting, horizontal ears spaced apart vertically and apertured in vertical alinement, said ears being rigidly joined to the members and extending partly into the space between the members to serve as spacers; an elongated lower member extending forwardly and generally horizontally from a lower part of the upright element and offset laterally from the implement-receiving space, said lower member having its rear end portion rigidly joined to one of the upright members; spacer means between and rigidly joining the upright members in the zone of the junction of the lower member therewith; a forwardly opening U-shaped member rigidly joined to the front end of the lower member and having upper and lower ears spaced apart and apertured in vertical alinement to provide front mounting means spaced ahead of the aforesaid rear mounting means; and a brace rigidly joined to the U-shaped member and diverging upwardly and rearwardly and having its rear end rigidly joined to an upper part of the rear upright element and offset to the same side of said implement-receiving space as the lower member.

5. Implement mounting means comprising: first and second adjacent elements, each having upper and lower vertically spaced apart ear means arranged so that the upper ear means of the first element lies directly above the upper ear means of the second element and the lower ear means of said first element lies directly below and supports the lower ear means of said second element, each of the ear means having a circular opening therein on a vertical axis and said openings being vertically coaxial so that the two upper openings register and the two lower openings register; the two upper openings being of the same diameter and the diameters of the two lower openings being equal but less than that of the upper openings; and a connecting pin having stepped-diameter portions respectively at its upper and lower ends and downwardly insertable through the ear means, said upper and lower pin portions being respectively tolerably receivable by the two upper openings and the two lower openings, and the axial length of the lower pin portion being such that said lower pin portion may be completely received by the two lower openings before reception of the upper pin portion by the two upper openings.

References Cited in the file of this patent

UNITED STATES PATENTS

| | | |
|---|---|---|
| 2,365,677 | Burns | Dec. 26, 1944 |
| 2,371,502 | Burns | Mar. 13, 1945 |
| 2,463,803 | Pilch | Mar. 8, 1949 |
| 2,475,498 | Haynes | July 5, 1949 |
| 2,494,684 | Best | Jan. 17, 1950 |
| 2,495,144 | Simmonds | Jan. 17, 1950 |
| 2,534,886 | Stueland | Dec. 19, 1950 |
| 2,535,727 | Dingley | Dec. 26, 1950 |
| 2,614,712 | Dingley | Oct. 21, 1952 |